Feb. 3, 1959   G. E. PRICE   2,872,558
OVEN HEATING APPARATUS
Filed Jan. 16, 1957
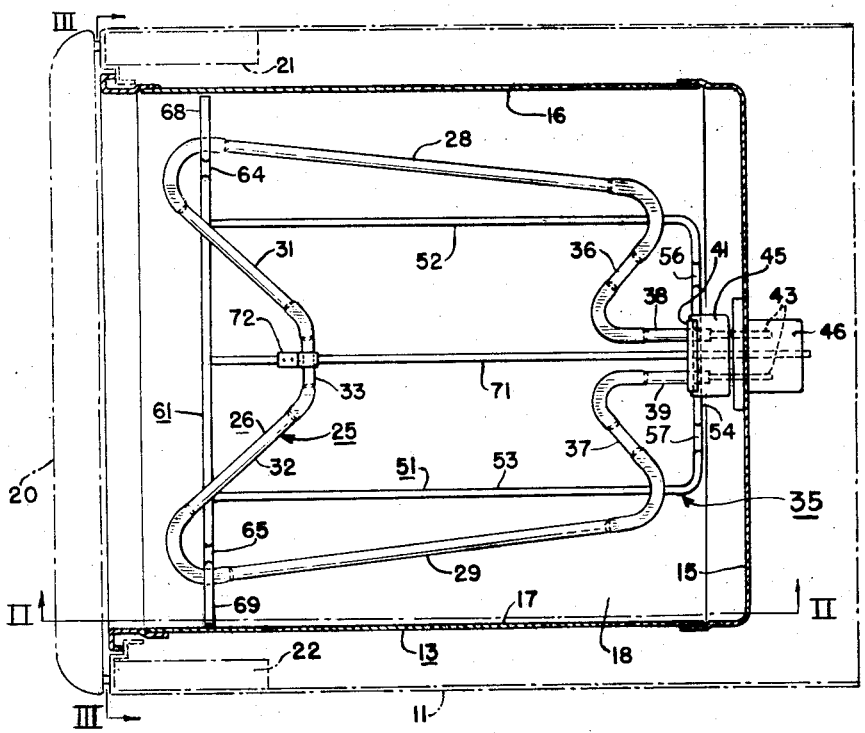
FIG. 1.
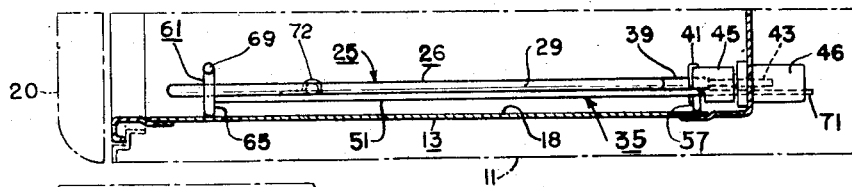
FIG. 2.
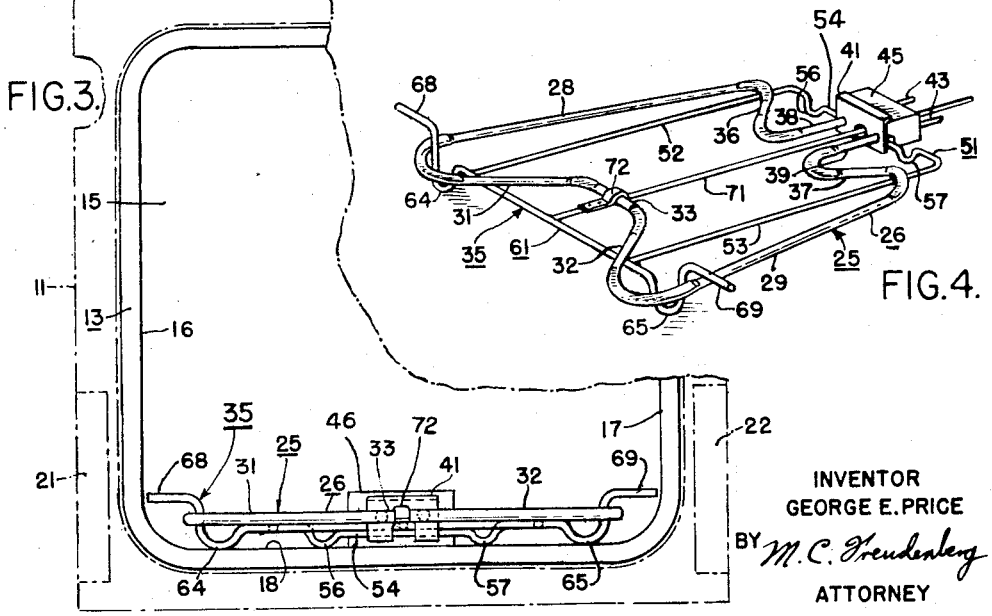
FIG. 3.
FIG. 4.
INVENTOR
GEORGE E. PRICE
BY M. C. Freudenberg
ATTORNEY United States Patent Office 2,872,558
Patented Feb. 3, 1959

2,872,558

OVEN HEATING APPARATUS

George E. Price, Mansfield, Ohio, assignor to Westinghouse Electric Corporation, East Pittsburgh, Pa., a corporation of Pennsylvania Application January 16, 1957, Serial No. 634,488

4 Claims. (Cl. 219—35)

This invention relates to an improved electrical sheathed oven heater construction and to improvements in a wire rack for supporting and positioning the heater within an oven.

One of the objects of this invention is to provide an improved oven heater configuration to help maintain a more uniform temperature within an oven.

Another object of this invention is to provide a novel configuration for a sheathed oven heater that will be simple and economical to manufacture and provide uniform heating in an oven.

Still another object of this invention is to improve the construction of a sheathed oven heater to eliminate the necessity of providing special lugs or other locating means attached to the bottom or side walls of an oven liner to properly position the heater for symmetrical and uniform heat distribution to both sides of the oven.

A further object of this invention is to provide a simplified oven heater supporting rack which may be manufactured in a variety of sizes for different sized heaters with only minor adjustments of the gauges on the forming tools.

In accordance with one feature of this invention an electrical sheathed oven heater is formed in a flat loop having a pair of straight sides with both its front and rear portions bent inwardly between the sides and toward the center of the heater loop to improve heat distribution and help maintain a more uniform temperature throughout the interior of an oven during a baking operation. Another feature of the invention relates to an improved wire heater-supporting rack having portions engageable with the bottom and side walls of the oven to centrally support the heater therein in spaced relationship with these walls. The front portion of the rack has laterally extending elements which are engageable with vertical inner side walls of the oven to centrally position the heater between these side walls.

The foregoing and other objects are effected by the invention as will be apparent from the following description and claims taken in connection with the accompanying drawings, forming a part of this application, in which:

Fig. 1 is a horizontal section taken through an oven, looking down on a heater disposed on the bottom oven wall;

Fig. 2 is a vertical section taken on line II—II of Fig. 1;

Fig. 3 is a front view of the oven with the oven door removed, as seen on line III—III of Fig. 1; and Fig. 4 is a perspective view of the oven heater and rack assembly removed from the oven.

Referring to the drawings in detail, there is illustrated in dot and dash lines an oven frame or cabinet 11 within which an open-front metal oven liner 13 is secured by any suitable supporting means. The liner 13 is generally box-shaped, having a vertical back wall 15, side walls 16 and 17 and a flat bottom wall 18. The open front end of the liner is closed by a double-paneled metal door 20, also indicated by dot and dash lines, which may be pivotally supported at its lower edge on the oven frame 11 by any suitable hinge and counter-balancing mechanism (not shown) usually disposed in the boxes 21 and 22 indicated at the front corners of the oven. The door 20 and the space between the liner 13 and the frame 11 is filled with some suitable thermal insulation material except in the area of the boxes 21 and 22.

Due to the thermal conduction of heat around the periphery of the door 20 and through the overlapping heat conducting portions of the front of the oven liner 13 and the frame 11, the heat losses in the vicinity of the oven door are apt to be higher than at other parts of the oven. Increased heat losses at the front of the oven may also be due to the reduction in thermal insulation at the sides of the oven liner where the hinge and counterbalancing mechanisms are located.

Located within the oven liner is an electrical sheathed heater 25 which is formed from a long helically coiled electrical resistance element (not shown) enclosed by a tubular metal sheath 26 and electrically insulated therefrom by any suitable material, such as compacted granular magnesium oxide. Before being formed in the configuration shown, the heater 25 is formed as a long rod with the resistance of the heating element being uniform along the length of the heater.

The heater 25 is formed as a flat irregular loop that is symmetrical about its front to rear center line and has straight convergent sides 28 and 29 which are equally inclined with respect to the front to rear center line and converge to intersect this center line at a point to the rear of the heater. The front of the heater is formed by a recessed or V-shaped heater portion having a pair of straight legs 31 and 32 joined to the heater sides 28 and 29, respectively, and extending inwardly toward the center of the heater loop. The legs 31 and 32 of this V-shaped portion each form an acute angle with respect to the sides 28 and 29 respectively, at the front corners of the heater. At the apex of the V-shaped portion, there is a short central transversely extending portion 33 for securing the heater to a wire supporting rack or frame 35 in a manner to be described hereinafter.

The rear of the heater loop comprises inwardly extending portions on opposite sides of its center which appear in the illustrated embodiment as forwardly converging straight heater sections 36 and 37 connected to the rear of the convergent side portions 28 and 29, respectively, and forming acute angles therewith at the rear corners of the heater. The heater 25 is bent at the inner ends of the sections 36 and 37 to form adjacent, generally parallel, rearwardly extending terminal portions 38 and 39 close to the center line of the heater. The terminal portions 38 and 39 of the heater 25 extend through openings in a metal terminal shield 41 and the shield is staked or otherwise secured to the sheath of the heater 25.

A pair of electrically conducting male terminals 43 are connected to the resistance element within the sheath of the heater 25 and project rearwardly from the terminal portions 38 and 39 of the heater. The male terminals 43 are rigidly supported in electrically insulated relationship relative the heater sheath and terminal shield 41 by a ceramic electrically insulating block 45. Electrical connections to the heater 25 are made within the oven by means of a female electrical connector 46 arranged to receive the male terminals 43 and secured to the rear oven wall 15 near the bottom and center thereof. When the heater terminals 43 are plugged into the female connector 46, the rear corners of the heater will be spaced farther from the rear and side walls of the oven liner 13 than the spacing of the front heater corners with respect to the inside of the door 20 and the sides of the liner 13, respectively.

The bends joining the above-mentioned straight portions of the heater 25 are of relatively small radius. During the forming of the heater loop these bends are flattened in the plane of the heater loop to compact the magnesium oxide within the heater sheath 26 and prevent the heater element from being electrically grounded to the sheath within the latter.

The heater 25 is supported centrally between the side walls 16 and 17 and above the bottom wall 18 of the oven liner 13 by means of the wire rack 35 secured to the sheath of the heater 25 and to the terminal shield 41 located at the rear center of the oven heater assembly.

The rack 35 comprises a U-shaped stiff metal wire or rod 51 having parallel side portions 52 and 53 connected by a transversely extending rear portion 54. The rear portion 54 is welded or otherwise secured near its center to the lower rear side of the terminal shield 41. This rear portion 54 is bent on opposite sides of the terminal shield to form depending feet 56 and 57 engageable with the bottom wall 18 of the oven liner 13. The U-shaped member 51 engages the underside of the heater 25 near each of the rear heater corners to support the heater. A cross member 61 formed of a stiff metal wire rod forms the front of the rack 35 and extends across the open end of the U-shaped rod 51 and is welded to the front ends of the latter. The cross member has a straight center portion extending laterally beneath the front legs 31 and 32 of the heater. This cross member 61 is bent to form downwardly projecting feet 64 and 65 adjacent the front corners of the heater 25 and is bent with vertical or upwardly extending portions located just inside the heater loop at these front corners. The ends 68 and 69 of the cross member 61 extend outwardly above the sheath of the heater 25 to engage the side walls 16 and 17 near the front of the oven. The length of this cross member 61 is only slightly less than the inside width of the oven liner 13, so that only slight lateral movement of the rack 35 and heater 25 is permitted within the liner. The heater assembly is widest at the cross member and the ends 68 and 69 thereof are the only portions of the rack 35 that extend laterally beyond the heater loop, the heater assembly engaging the side walls of the oven only near the front of the latter. The vertical portions of the cross member 61 which are located just inside the front corners of the heater between the feet 64 and 65 and the ends 68 and 69, respectively, prevent the heater from moving laterally relative the rack 35 when the heater is cool, but permit slight outward movement of the front corners of the heater 25 as the latter expands upon being heated. A straight metal wire rod 71 is fastened, as by welding, to the center of the cross member 61, forming a T therewith, and extends rearwardly across the center of the rectangle formed by the U-shaped member 51 and cross member 61. The rod 71 extends rearwardly through the terminal shield 41, to which it is also welded, and through the block 45 to engage a grounded electrical connection within the female connector 46 supported in the rear wall 15 of the oven. This grounding electrical connection may be a spring secured to the oven liner to provide a good electrical connection therewith. The rod 71 extends beneath the apex or center portion 33 of the V-shaped front of the heater 25 and the heater portion 33 is secured thereto by a clamp or tie bracket 72 welded to the rod. The rod 71 not only is the means for electrically grounding the exposed metal parts of the heater 25 to the liner 13 and frame 11, but it also serves to stiffen the rack and heater assembly. The cross wire 61 serves as a handle for removing and replacing the heater 25 from the oven 13.

Before assembly of the heater 25 and the rack 35, the rack 35 and terminal shield 41 are formed as one subassembly. The heater 25 is slipped over the rack 35 with the rearwardly extending heater terminal portions 38 and 39 projecting through the terminal shield 41. The shield is then staked to secure these terminal portions thereto and the tie bracket 72 is welded to the rod 71 to anchor the front center portion 33 of the heater to the rack.

The heater configuration described above provides improved heat distribution to maintain the temperature throughout an oven more uniform during a baking operation, particularly in an oven that is relatively deep from front to rear with respect to either its height or its width. In the illustrated embodiment of the invention the liner 13 has a depth greater than either its width or height, but a heater of the same general configuration as heater 25 will provide improved heat distribution in other ovens where the depth is more than one half the width or height of the oven. The inwardly projecting front and rear heating portions together with the tapered or convergent side portions distribute heat to maintain more uniform temperatures throughout the oven as well as providing additional heat in areas of the oven where heat losses are greatest. The simple configuration of the wire rack 35 comprising the simply formed U-shaped member 51, the cross member 61 and the rod 71 is such that these segments of the rack may be readily varied in size to provide different size racks for different size heaters with only a slight change in the forming tools with which the rack is made. Furthermore, the rack 35 positions the heater 25 relative both the bottom and side walls of the oven without requiring any special locating means on the oven walls.

While the invention has been shown in but one form, it will be obvious to those skilled in the art that it is not so limited but is susceptible of various changes and modifications without departing from the spirit thereof.

Applicant's assignee is the owner of Patent No. 2,844,701, issued July 22, 1958 for Heating Apparatus and containing broad claims relating to the subject matter of this application.

What is claimed is:

1. A heater assembly for an oven comprising a tubular sheathed electrical resistance heater, said heater being formed in a flat loop having two front corners and two rear corners, an electrical connector secured to said heater for making electrical connections thereto, a portion of said loop between said front corners being formed inwardly toward the center of said loop, a U-shaped wire member having its open end disposed adjacent the front of said loop and its closed end engaging the underside of said heater adjacent said rear corners to support the latter, the closed end of said U-shaped member being bent to provide downwardly extending feet engageable with the bottom wall of the oven, a cross member connected across the open end of said U-shaped member, said cross member having a central portion extending beneath the inwardly bent front portion of the heater, said cross portion being formed with spaced downwardly projecting feet engageable with the bottom wall of the oven, the end portions of said cross member being bent upwardly inside the front corners of said heater and then laterally outwardly thereabove, the outwardly projecting ends of said cross member being engageable with the side walls of the oven to centrally locate the front end of said heater therebetween.

2. An oven heater comprising a tubular sheathed electrical resistance element bent to form an irregular flat loop, said loop having a pair of front corners and a front portion of said heater between said corners being bent inwardly toward the center of the loop, a T-shaped wire frame comprising a rod and a cross bar extending normal thereto for supporting the front portion of said heater, the cross bar of said frame extending laterally of said heater beneath said inwardly bent front heater portion, said cross bar being bent near each end thereof to form feet depending therefrom to engage the bottom wall of an oven and having a portion extending generally vertically just inside the front corners of the heater and extending laterally beyond the heater at the sides of the loop, the ends of said cross bar being engageable with the side walls of an oven to centrally locate the front of the heater therebetween, said rod extending beneath the center of said inwardly bent front portion and rearwardly of said heater, electrical connecting means for making electrical connections to said heater and an electrically insulating terminal block rigidly secured to said connecting means and said rod at the rear of the heater, and means for securing the center of said inwardly bent heater portion to said rod to prevent distortion of said heater loop during insertion and removal of said heater from the oven.

3. An oven heater assembly comprising a tubular sheathed electrical resistance heater, said heater being formed in a flat loop having a pair of rear corners and a pair of front corners, the front portion of said heater between said front corners being formed inwardly toward the center of said loop, a wire rack for supporting said heater comprising a U-shaped member with its open end toward the front of the heater, the closed end of said member providing support for the rear heater corners and having depending feet bent therefrom for engaging a flat bottom wall of an oven, the rack including a cross member integrally secured to the sides of said U-shaped member at its open end and extending outwardly at both sides of the latter, said cross member having a center section extending beneath the inwardly extending front heater portion for supporting the latter, the rack having depending feet at the front of the heater for engagement with the bottom oven wall, said cross member having portions disposed outwardly of said center section and located immediately adjacent the front corners of the heater to limit lateral movement of the heater relative the rack, said cross member extending substantially the same distance beyond both sides of said heater to form abutments engageable with the side walls of the oven to centrally locate the heater with respect to the side walls, and a terminal construction secured to said U-shaped member at the rear center thereof for making electrical connections to said heater.

4. An oven heater comprising a tubular sheathed electrical resistance element bent to form an irregular flat loop, said loop having a pair of front corners and a pair of rear corners, the portion of said heater between said front corners being bent inwardly toward the center of the loop, a T-shaped wire frame comprising a cross bar and a rod extending normal thereto for supporting the front portion of said heater, the cross bar of said frame extending laterally of said heater beneath said inwardly bent front heater portion, said cross bar being bent to form a pair of spaced feet depending therefrom to engage the bottom wall of an oven, said bar extending generally vertically just inside the front corners of the heater and extending laterally above the heater and to the outside of the loop, the ends of said cross bar being engageable with the side walls of the oven to centrally locate the front of the heater therebetween, the rod of said T-shaped frame extending beneath the center of said inwardly bent portion and rearwardly of said heater, electrical terminals on said heater for making electrical connections thereto, an electrically insulating terminal block rigidly supporting said terminals relative said frame at the rear of the heater, means for securing the center of said inwardly bent heater portion to said rod to prevent distortion of said heater loop during insertion and removal of said heater from the oven, a U-shaped wire member supporting rear corners of said heater loop and having its closed end secured to said terminal block and the sides of said U-shaped member extending toward the front of the heater and being secured to said cross bar on opposite sides of said rod, and depending feet formed in said U-shaped member on opposite sides of said terminal block.

References Cited in the file of this patent
UNITED STATES PATENTS

| | | |
|---|---|---|
| 1,982,386 | Heinbuch | Nov. 27, 1934 |
| 2,137,149 | Tuttle | Nov. 15, 1938 |
| 2,221,595 | Lockwood | Nov. 12, 1940 |
| 2,408,295 | Cossin | Sept. 24, 1946 |
| 2,762,899 | Lenz | Sept. 11, 1956 |